(12) United States Patent
Demoss

(10) Patent No.: US 11,768,693 B2
(45) Date of Patent: Sep. 26, 2023

(54) SYSTEM AND METHOD FOR CONFIGURABLE DEVICE MANAGEMENT

(71) Applicant: Dell Products L.P., Round Rock, TX (US)

(72) Inventor: Jeffrey James Demoss, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 17/496,968

(22) Filed: Oct. 8, 2021

(65) Prior Publication Data

US 2023/0116025 A1 Apr. 13, 2023

(51) Int. Cl.
*G06F 9/44* (2018.01)
*G06F 9/445* (2018.01)

(52) U.S. Cl.
CPC ................. *G06F 9/44505* (2013.01)

(58) Field of Classification Search
CPC ..................... G06F 1/32; G06F 1/12
See application file for complete search history.

(56) References Cited

U.S. PATENT DOCUMENTS

| | | | |
|---|---|---|---|
| 2019/0370291 A1* | 12/2019 | Wang | G06F 16/90335 |
| 2019/0371253 A1* | 12/2019 | Morein | H04N 19/46 |
| 2020/0044940 A1* | 2/2020 | Thomasson | H04L 41/085 |
| 2022/0202492 A1* | 6/2022 | Lavoritano | G16H 50/50 |
| 2022/0231932 A1* | 7/2022 | Zhang | H04L 65/60 |

* cited by examiner

*Primary Examiner* — Keshab R Pandey
(74) *Attorney, Agent, or Firm* — Womble Bond Dickinson (US) LLP

(57) ABSTRACT

Methods and systems for managing configurable devices are disclosed. A configurable device may be a type of hardware device that may be configured for various purposes. The operation of the configurable device may depend on its configuration. To manage the configurable device, the system may track the configuration of configurable devices and associate the configurations with visual indicators of the configurable devices that are present prior to configuration. The visual indicators may not indicate the configuration of the configurable devices.

20 Claims, 16 Drawing Sheets

SYSTEM AND METHOD FOR CONFIGURABLE DEVICE MANAGEMENT

FIELD

Embodiments disclosed herein relate generally to device management. More particularly, embodiments disclosed herein relate to systems and methods to manage the configurations of multiple configurable devices.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
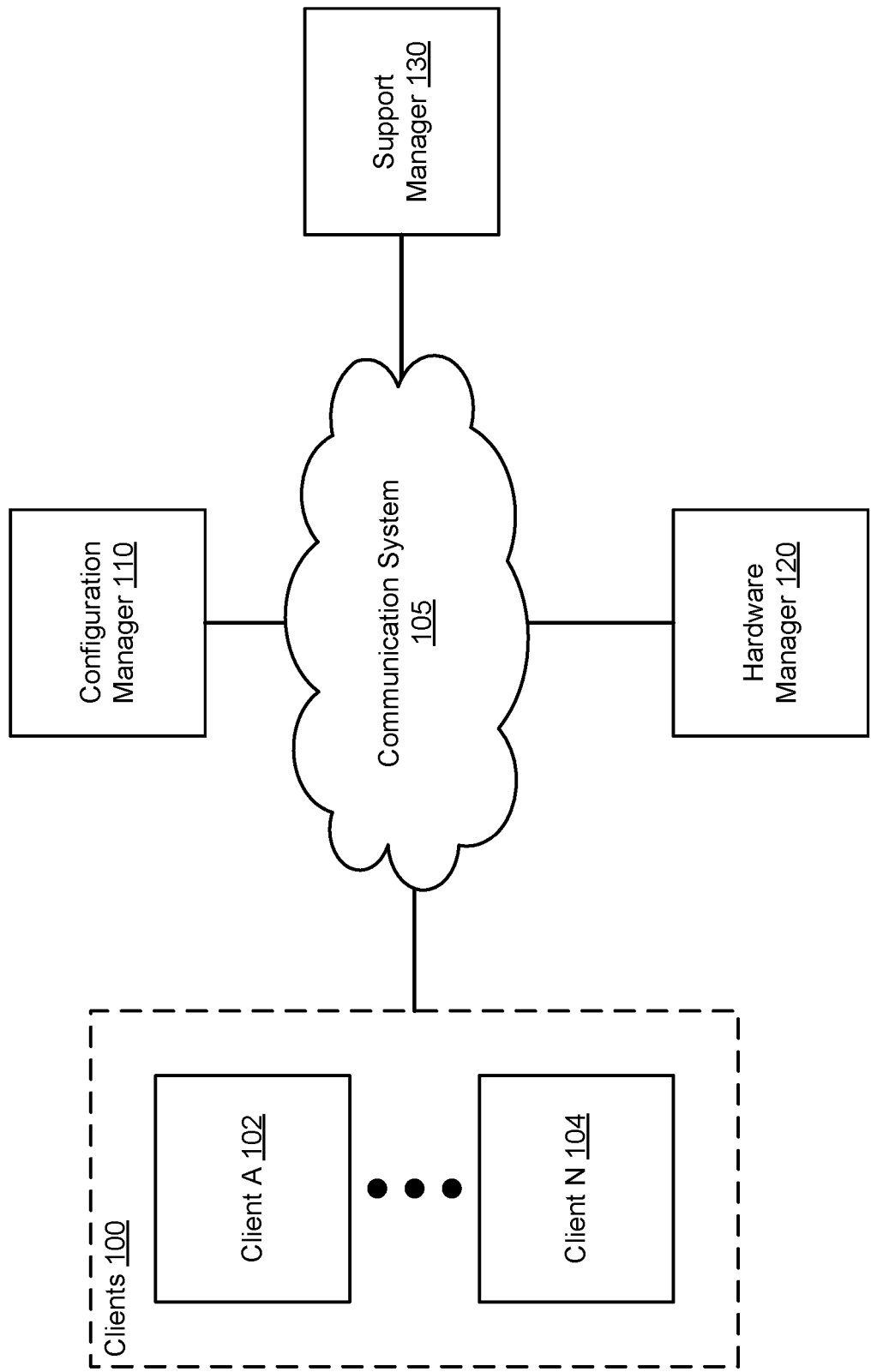
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing configurable devices. A configurable device may be a type of hardware device that may be configured for various purposes. The operation of the configurable device may depend on its configuration.

To manage the configurable device, the system in accordance with an embodiment may track the configuration of configurable devices and associate the configurations with visual indicators of the configurable devices that are present prior to configuration. The visual indicators may not indicate the configuration of the configurable devices.

The associations between the visual indicators and configurable devices may be used to provide augmented reality depictions of the configurable devices. The augmented reality depictions may indicate the capabilities, capacities, and/or other information not otherwise indicated by the visual indicators of the configurable devices.

The augmented reality depictions may be obtained by generating graphical elements based on the configurations of the configurable devices. The graphical elements may be used to update images and/or videos depicting scenes in which the configurable devices are visible. The images and/or videos may be updated by positioning the graphical elements based on the visual indicators of the configurable devices in the scenes. In this manner, a person viewing a display on which the updated image/vide is shown may ascertain the capabilities, functionalities, and/or other characteristics (e.g., collectively, "features") of the configurable devices otherwise not indicated by the appearance of these devices.

By doing so, the features of configurable devices may be ascertained by a person without needing to read information from the configurable devices or otherwise access them. Consequently, the operation of such devices may not be compromised while the features regarding the configurable devices are ascertained.

In an embodiment, a computer-implemented method for managing a configurable device is provided. The method may include obtaining, by a client, an identifier for the configurable device from an enclosure of the configurable device; obtaining, by the client, configuration information for the configurable device using the identifier; generating a graphical element based on the configuration information; updating, based on the graphical element, an image of the enclosure based on the identifier present in the image to obtain an updated image; and after the image is captured, displaying the updated image on a display.

The configurable device may include a storage device for storing data, the storage device may include hardware for storing data; and configurable hardware adapted to be configured into at least two operating states. While in a first operating state of the at least two operating states, the configurable hardware manages operation of the hardware to provide a degree of storage resiliency to operational errors and a storage capacity. While in a second operating state of the at least two operating states, the configurable hardware may manage operation of the hardware to provide a higher degree of resiliency to the operational errors than is provided in the first operating state and a lower storage capacity than in the first operating state.

The identifier may not indicate which of the at least two operating states the configurable hardware is configured to operate.

The configurable device may be free of any visual indicators of which of the at least two operating states the configurable hardware is configured to operate.

Obtaining the configuration information may include sending, by the client, a message based on the identifier of the configurable device to support manager, the message being a key for a database populated with associations between identifiers of configurable devices and configuration information for the configurable devices; and receiving, by the client, a response to the message, the response indicating the configuration information.

The configuration information may reflect how configurable hardware of the configurable device was programmed, the programmed configurable hardware defining how hardware resources of the configurable device are used during operation to provide a degree of resiliency to operational errors and a storage capacity.

Obtaining the identifier may include obtaining, by the client, an image of the enclosure; and obtaining, by the client, a visual indicator corresponding to the identifier using the image of the enclosure. The visual indicator may discriminate the configurable device from all other configurable devices for which associations present in the database.

The computer-implemented method may also include prior to obtaining the identifier:

obtaining an un-configured configurable device; obtaining a configuration for the configurable device; configuring the un-configurable configurable device based on the configuration to obtain the configurable device; and populating the database with an association between the identifier and the configuration information, the configuration information being based on the configuration used to configure the un-configured configurable device.

Configuring the un-configurable configurable device may decrease a storage capacity of the configurable device and increases wear resistance of the configurable device.

The computer-implemented method may also include prior to obtaining the configuration for the configurable device: reading, from the un-configured configurable device, hardware information; matching the hardware information read from the un-configured configurable device to hardware information from a vendor of the un-configured configurable device; and performing an action set based on a degree of the matching to manage security of the configurable device.

Displaying the updated image on the display may include while substantially in real-time: obtaining video depicting a scene including the enclosure; modifying frames of the video prior to display based on the graphical element; and displaying, with the modified frames and the display, an augmented reality depiction of the scene, the augmented reality depiction comprising pixels corresponding to the graphical element that inform a user viewing the augmented reality depiction of the scene of a storage capacity of the configurable device that is not visually indicated by the configurable device.

The pixels may replace at least a portion of pixels of the video corresponding to an identifier of the configurable device displayed in the video.

A non-transitory media may include instructions that when executed by a processor cause the computer-implemented method to be performed.

A client and/or support manager may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide for the management of configurable devices. A configurable device may be a device that is configurable to provide different functionalities. Configuring a configurable device may change the manner in which various resources of the configurable device are utilized.

For example, consider an example configurable device such as a storage device. The storage device may include a controller and hardware resources (e.g., flash storage chips) for storing data. The controller may be programmed in different manners to utilize the hardware resources in different manners. For example, to provide a degree of resiliency to operational errors, some of the hardware resources may be used for storing parity information when data is stored in other storage resources. The parity information may be usable to correct random bit flips or other corruption, at the cost of reducing the effective data storage capacity of the storage device. Likewise, the controller may be programmed to reserve some hardware resources to improve wear leveling or increase the number of writes prior to likely failure of the hardware resources. Dedicating these hardware resources may reduce the effective storage capacity of the storage device. The resources available for data storage may depend on how the resources are used for other functions, in addition to data storage. Consequently, two configurable devices that have identical hardware resources may, depending on their respective configurations, have different amounts of resources available for use and/or provide different functionalities. Accordingly, it may not be possible to ascertain the effective resources (e.g., usable for storage in the context of a storage device) of a configurable device unless its configuration of its hardware resources are known.

To manage configurable devices, the configurations of the configurable devices may need to be available. However, by virtue of the configurability of the configurable devices, markings on enclosures or other types of static visual (or otherwise) indicators of such configurations may become out of date (e.g., stale) over time.

In general, embodiments disclosed herein provide for the management of configurable devices by allowing the configurations of the configurable devices to be ascertained. To provide for ascertaining of configurable devices, a system in accordance with an embodiment may include clients 100, configuration manager 110, hardware manager 120, and support manager 130. These components may track configurations of configurable devices and allow for the configurations of configurable devices to be ascertained. Each of these components is discussed below.

Configuration manager 110 may provide desired configuration tracking services. Desired configuration tracking services may include obtaining information regarding desired configurations (and/or information regarding desired effective resource availability, desired functionalities, etc.) of configurable devices and/or providing such information to other entity. The desired configuration information may specify, for example, various operational characteristics of a configurable devices that are to be met.

In the context of a storage device, the desired configuration information may specify, for example, (i) a desired storage capacity, (ii) a degree of resiliency to operational errors, (iii) a desired read and/or write speed(s), (iv) a desired operation live, quantity of write cycles, and/or other information, and/or (v) other information reflecting desired operation of the storage device. The desired configuration information may include other types of information usable to configure a configurable device without departing from embodiments disclosed herein. For example, the configurable device may be other types of devices (e.g., memory modules, communications devices, special purpose devices such as accelerators or graphics processing units, etc.).

In an embodiment, configuration manager 110 receives desired configuration information from future users of the configurable devices. For example, configuration manager 110 may be a part of and/or may be operably connected to a platform (e.g., sales platform) through which requisitions for devices are obtained.

Hardware manager 120 may provide un-configured configurable device tracking services. Un-configured configurable device tracking services may include (i) obtaining information regarding the hardware resources (e.g., configurable and/or un-configurable) of un-configured configurable devices, (ii) obtaining information regarding visual indicators of the un-configured configurable devices, and (iii) providing information based on the obtained information.

For example, an un-configured configurable device may include one or more visual indicators positioned on an exterior of an enclose that houses hardware resources of the un-configured configurable device. One or more of the visual indicators may discriminate the un-configured configurable device from other un-configured configurable devices as well as configured configurable devices. For example, the one or more of the visual indicators may include a universally unique identifier (UUID), different from other UUIDs of other devices, that uniquely discriminate respective configurable devices of a type from other configurable devices of the type. The visual indicators may also include an identifier that distinguishes types of configurable devices from other types of configurable devices. Thus, in an embodiment, the information regarding the visual indicators may include a type discriminator (e.g., a part type identifier) and a device of a type discriminator (e.g., a UUID). The combination of these discriminators may uniquely identify each configurable device from other configurable devices. For additional details regarding visual indicators, refer to FIG. 2C and the corresponding description below.

Support manager 130 may provide configured configurable device tracking services. Configured configurable device tracking services may include (i) obtaining information regarding configurations of configured configurable devices, (ii) obtaining discriminators associated with the configurable devices, (iii) performing one or validations (e.g., by using the discriminators and information from configuration manager 110), and (iv) providing information based on associations between the configurations of the configured configurable devices and the discriminators.

For example, support manager 130 may be part of or may be operably connected to a system that configured un-configured configurable devices. When the un-configured configurable devices are configured, support manager 130 may store associations between the configurations and the corresponding discriminators for the configurable devices. Consequently, the discriminators may be used as keys to, using the associations, obtain a configuration of a configured configurable device (which may otherwise not be discernable based on visual indicators of configurable devices).

Additionally, support manager 130 may also validate whether an actual configuration of a configurable device matches an expected configuration. For example, when a configurable device is operably connected to a computing device, various information regarding its configuration (e.g., effective storage capacity) may be retrieved and used, in combination with the discriminators, to compare the configuration to the configuration for the configurable stored in support manager 130. A difference between these two configurations may indicate, for example, that the configurable device is misconfigured, is not operating as expected, may be a fake device, etc.

For additional details regarding support manager 130, refer to FIG. 2B and the corresponding description below.

Clients 100, configuration manager 110, hardware manager 120, and/or support manager 130 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 6.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
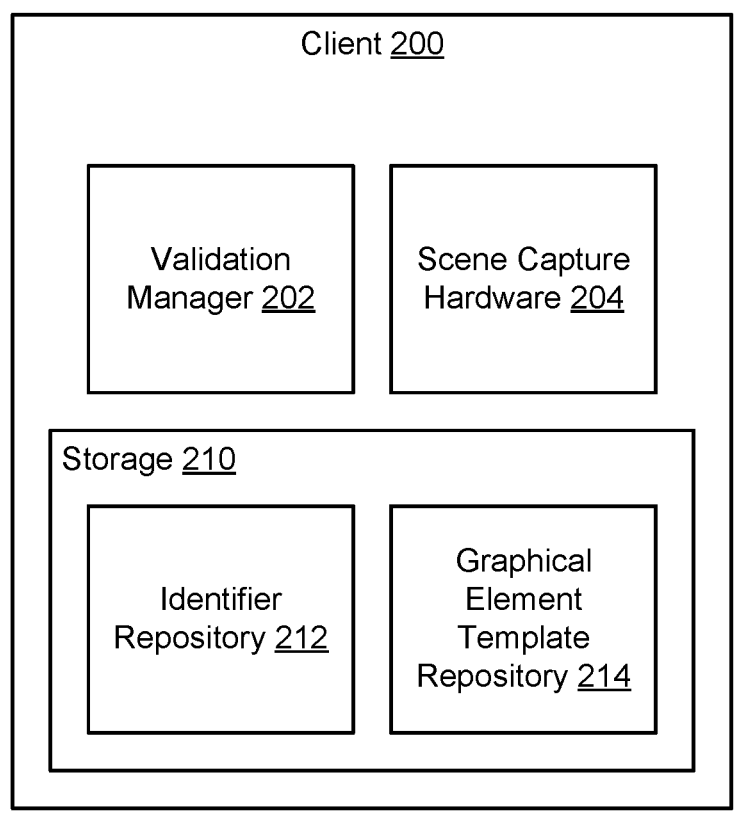
FIG. 2A shows a block diagram illustrating a client in accordance with an embodiment.

Turning to FIG. 2A, a diagram of an example client 200 in accordance with an embodiment is shown. Client 200 may be similar to any of clients 100.

Client 200 may provide configurable device validation services. Configurable device validation services may include (i) obtaining identification information for configurable devices, (ii) using the identification information to obtain configuration information for configurable devices identified with the identification information, (iii) generating graphical elements based on the obtained configuration, and/or (iv) providing augmented reality depictions of scenes with the graphical elements. By doing so, a user may be able to ascertain information regarding a configuration of a configurable device using visual indicators on an enclosure of a configurable device.

For example, a user of client 200 may obtain a picture of a configurable device, with a visual indicator of the configurable device being visible. The visual indicator may include an identifier associated with the configurable device. Client 200 may provide the identifier associated with the configurable device to a support manager, which may perform a lookup using the identifier (and/or other information such as a type discriminator) to obtain configuration information associated with the configurable device. The support manager may provide the configuration information to client 200 which may use the configuration information to generate graphical elements. Client 200 may use the graphical elements to display an augmented reality depiction of the scene including the configurable device to convey the configuration information to a user of client 200. For example, client 200 may capture video depicting the configurable device, augment the video by modifying it to include the graphical elements (e.g., by replacing the identifier on a housing of the configurable device with graphical element), and present, via a display, the modified video substantially in real-time with the capture and/or augmentation. The graphical elements may present, in the augmented video, information regarding the configuration of the configurable device. The placement, presentation, and/or other characteristics of the graphical elements may cause a user of client 200 to associate the configuration information with the configurable device. Client 200 may perform the above with respect to any number of configurable devices thereby providing augmented reality depictions of scenes usable to convey, to users of client 200, associations between configuration information for each configurable device in the depiction with the corresponding configurable device.

To provide its functionality, client 200 may include validation manager 202, scene capture hardware 204, and storage 210. Each of these components is discussed below.

Validation manager 202 may orchestrate performance of the validation services. When doing so, validation manager 202 may invoke the functionality of scene capture hardware 204 to obtain pictures and/or videos that may depict configurable devices. Validation manager 202 may use the depictions to obtain visual indicators of the configurable devices, use the visual indicators to obtain configuration information, and/or generated augmented reality of depictions of configurable devices displayed to users of client 200.

Additionally, validation manager 202 may utilize graphical users interfaces to, for example, obtain information regarding configurable devices from users of client 200, may cooperate with support managers to obtain configuration information for configurable devices and report discrepancies between configurations of configurable devices (and/or other information such as hardware resource information) obtained by the user and configuration information stored in a support manager, and/or perform other functionality to reduce a burden on a user of client 200 with respect to ascertaining configurations of configurable devices and/or validating (e.g., determining whether an actual configuration matches an expected configuration) the configurable devices.

When providing its functionality, validation manager 202 may perform all, or a portion, of the methods illustrated in FIGS. 3A-5B.

In an embodiment, validation manager 202 is implemented using a hardware device including circuitry. The hardware device may be, for example, a digital signal processor, a field programmable gate array, or an application specific integrated circuit. The circuitry may be adapted to cause the hardware device to perform the functionality of validation manager 202. Validation manager 202 may be implemented using other types of hardware devices without departing from embodiments disclosed herein.

In one embodiment, validation manager 202 is implemented using a processor adapted to execute computing code stored on a persistent storage that when executed by the processor performs the functionality of validation manager 202 discussed throughout this application. The processor may be a hardware processor including circuitry such as, for example, a central processing unit or a microcontroller. The processor may be other types of hardware devices for processing digital information without departing from embodiments disclosed herein.

When providing its functionality, validation manager 202 may store data and use data stored in storage 210.

Scene capture hardware 204 may provide scene capture services. Scene capture services may include obtaining images and/or videos of scenes. One or more configurable devices may be present in one or more of the obtained images and/or videos.

Scene capture hardware 204 may also provide information extraction services. Information extraction services may include obtaining visual indicators from the images and/or videos corresponding to configurable device identifiers and/or configurable device type identifiers. To do so, scene capture hardware 204 may perform pattern matching, image recognition, and/or other functionalities usable to extract predetermined types of visual indicators. For example, scene capture hardware 204 may include functionality to read and/or extract bar codes, quick response (QR) codes, and/or other types of visual indicators that may be included on enclosures or other components of configurable devices.

In an embodiment, scene capture hardware 204 is implemented with a camera and/or an application specific integrated circuit (or other type of hardware device). The camera may be capable of capturing images and/or videos. The application specific integrated circuit may include circuitry adapted to extract and/or read the visual indicators included in images and/or videos obtained with the camera.

In an embodiment, scene capture hardware 204 does not include a camera or other devices with which images and/or videos may be obtained from an ambient environment. Rather, scene capture hardware 204 may obtain images and/or videos from other components (which may not be part of client 200) and use the obtained images and/or videos to provide its functionality.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including identifier repository 212 and/or graphical element template repository 214.

Identifier repository 212 may include one or more data structures that include information regarding identifiers and configuration information. For example, when client 200 obtains one or more identifiers for a configurable device, the identifiers may be used to retrieve configuration information associated with the configurable device from a support manager. The obtained information along with the identifiers may be stored in identifier repository 212. The information included in identifier repository 212 may be used, for example, to generate graphical elements, identify visual indicators in images and/or videos, and/or generate augmented reality depictions based on the graphical element and images/videos.

Graphical element template repository 214 may include one or more data structures that include information regarding how to generate graphical elements using configuration information from identifier repository 212. For example, graphical element template repository 214 may include templates that include replacement fields for information from identifier repository 212. Graphical elements may be generated by replacing the replacement fields with configuration information from identifier repository 212 in an instance of a template in memory.

While illustrated in FIG. 2A as including a limited number of specific components, a client in accordance with an embodiment may include fewer, additional, and/or different components than shown in FIG. 2A.

Figure 2B:
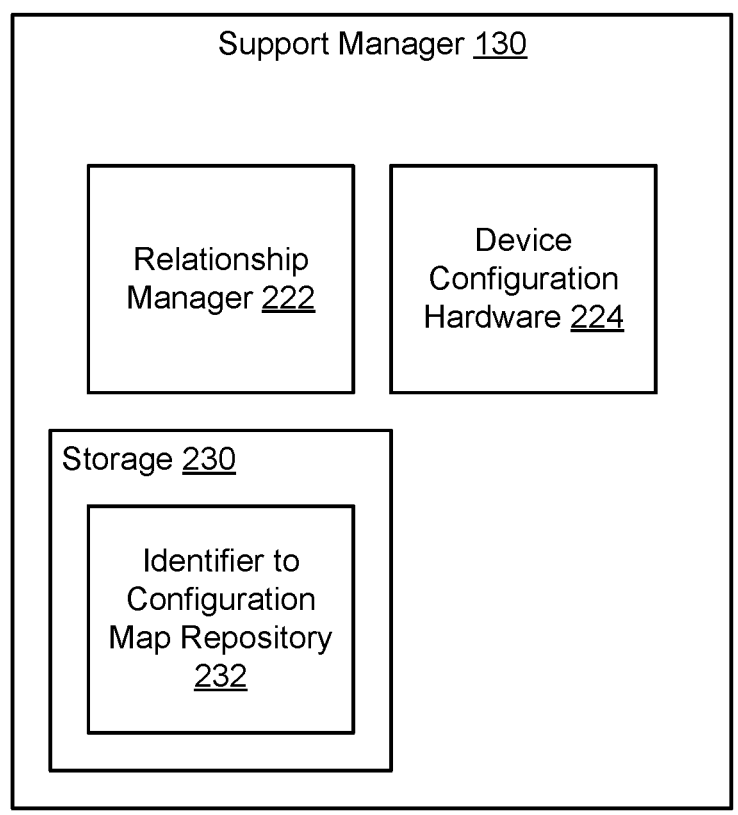
FIG. 2B shows a block diagram illustrating a support manager in accordance with an embodiment.

Turning to FIG. 2B, a diagram of support manager 130 in accordance with an embodiment is shown.

Support manager 130 may provide for (i) configuration of configurable devices and (ii) providing of configuration information used for configuration of the configurable devices. To provide its functionality, support manager 130 may include relationship manager, device configuration hardware 224, and storage 230. Each of these components is discussed below.

Relationship manager 222 may manage the process of configuring configurable device and maintain an identifier to configuration map repository 232.

To manage the process of configuring configurable devices, relationship manager 222 may (i) obtain information regarding desired configurations (e.g., from configuration manager 110), (ii) obtain identifier information for un-configured configurable devices, (iii) configure the un-configured configurable devices based on the obtained information regarding desired configurations, and (iv) update the identifier to configuration map repository 232 based on the configurations and identifiers of the un-configured configurable devices that are configured using the configurations.

To provide configuration information for configured configurable devices, relationship manager 222 may (i) obtain information usable as keys for identifier to configuration map repository 232, (ii) use the obtained information to obtain configuration information from identifier to configuration map repository 232, and (iii) provide the configuration information to service requests for the configuration information associated with configured configurable devices.

When providing its functionality, relationship manager 222 may perform all, or a portion, of the methods illustrated in FIGS. 3A-5B.

In an embodiment, relationship manager 222 is implemented using a hardware device including circuitry. The hardware device may be, for example, a digital signal processor, a field programmable gate array, or an application specific integrated circuit. The circuitry may be adapted to cause the hardware device to perform the functionality of relationship manager 222. relationship manager 222 may be implemented using other types of hardware devices without departing from embodiments disclosed herein.

In one embodiment, relationship manager 222 is implemented using a processor adapted to execute computing code stored on a persistent storage that when executed by the processor performs the functionality of relationship manager 222 discussed throughout this application. The processor may be a hardware processor including circuitry such as, for example, a central processing unit or a microcontroller. The processor may be other types of hardware devices for processing digital information without departing from embodiments disclosed herein.

When providing its functionality, relationship manager 222 may store data and use data stored in storage 230.

Device configuration hardware 224 may provide configurable device configuration services. These services may include configuring configurable devices (e.g., by programming configurable hardware of the configurable devices).

In an embodiment, device configuration hardware 224 is implemented with a processor, communication circuitry, and/or special purposes devices adapted to configure configurable hardware.

In an embodiment, storage 230 is implemented using physical devices that provide data storage services (e.g., storing data and providing copies of previously stored data). The devices that provide data storage services may include hardware devices and/or logical devices. For example, storage 230 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 230 may include a memory device (e.g., a dual in line memory device) in which data is stored and from which copies of previously stored data are provided. In another example, storage 230 may include a persistent storage device (e.g., a solid-state disk drive) in which data is stored and from which copies of previously stored data is provided. In a still further example, storage 230 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 230 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 230 may store data structures including identifier to configuration map repository 232. For additional details regarding identifier to configuration map repository 232, refer to FIG. 2D and the corresponding description below.

While illustrated in FIG. 2B as including a limited number of specific components, a support manager in accordance with an embodiment may include fewer, additional, and/or different components than shown in FIG. 2B.

Figure 2C:
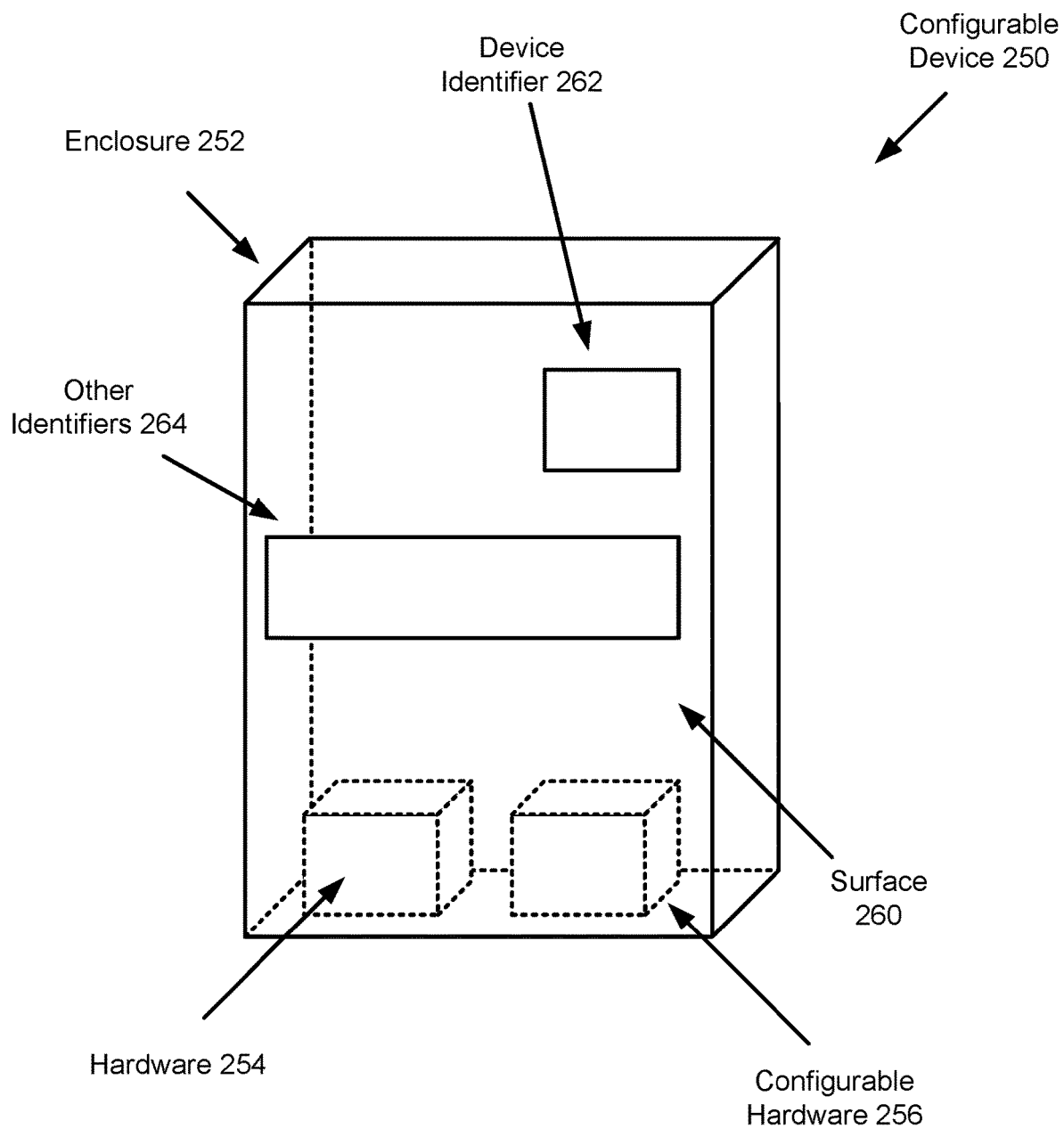
FIG. 2C shows a block diagram illustrating a configurable device in accordance with an embodiment.

Turning to FIG. 2C, a diagram of an example of a configurable device 250 in accordance with an embodiment is shown. In FIG. 2C, portions of configurable device 250 that may be obscured from the view point used in the figure may be illustrated with dashed outlining.

Configurable device 250 may be configurable to perform different functions. Configuring configurable device to perform various functions may impact the effective resources that it may have available to perform some or all of its functions.

To provide its functionality, configurable device 250 may include enclosure 252. Enclosure 252 may include a physical structure in which hardware 254 (e.g., not configurable) and/or configurable hardware 256 of configurable device 250 is housed. Generally, hardware 254 may include one or more physical devices that may be used to perform various functions such as processing, data storage, communications, etc. Configurable hardware 256 may manage the operation and/or use of hardware 254 to provide services. Configurable hardware 256 may be programmable, configurable, or otherwise modifiable. Depending on the configurable of configurable hardware 256, configurable device 250 may perform different functions, may have different quantity of resources available for use to perform some functions, etc. Thus, any number of configurable devices 250 having the same hardware 254 and/or configurable hardware 256 may operate in different manners, may provide different services, etc. Accordingly, it may be desirable to know the configuration of configurable hardware 256 so that expectations regarding configurable device 250 may be appropriately set. However, configurable device 250 may not include any visual indicators that directly indicate the configuration of configurable hardware.

Rather, configurable device 250 may include device identifier 262 and other identifiers 264 positioned on surface 260 of enclosure 252. These identifiers may be set prior to configuration of configurable hardware 256. For example, when an un-configured configurable device is manufactured, these identifiers may be added to configurable device 250. Subsequently, configurable hardware 256 may be configured. Thus, no identifiers may be present on enclosure 252 (and/or any other portions of configurable device 250) that indicates the configuration of configurable hardware 256.

In an embodiment, device identifier 262 and/or other identifiers 264 are implemented with visual indicators such as, for example, barcodes, QR codes, and/or other types of graphics adapted for reading by various machines, such as client 200.

Once configurable hardware 256 is configured, identifiers 262, 264 may not be updated and/or other identifiers indicating the configuration of configurable hardware 256 may not be added to configurable device 250. Thus, the visual indicators of configurable device 250 may only allow for configurable device 250 to be discriminated from other configurable devices (and may not directly indicate a configuration of configurable device 250).

In the context of, for example, a storage device, hardware 254 may be implemented with flash storage chips and configurable hardware 256 may be implemented with a controller. In the context of, for example, a graphics processing unit, hardware 254 may be implemented with memory chips and configurable hardware 256 may be implemented with a processing pipeline and/or controller.

While illustrated in FIG. 2C as including a limited number of specific components, a configurable device in accordance with an embodiment may include fewer, additional, and/or different components than shown in FIG. 2C.

Figure 2D:
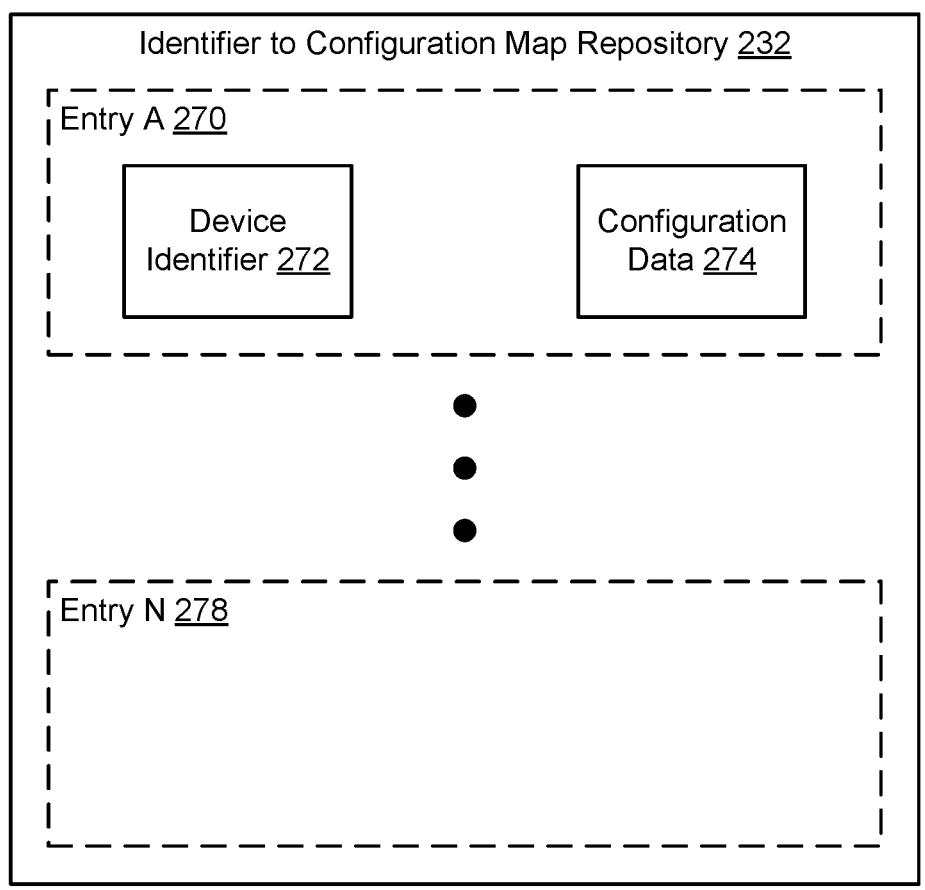
FIG. 2D shows a block diagram illustrating an identifier to configuration map repository in accordance with an embodiment.

Turning to FIG. 2D, a diagram of identifier to configuration map repository 232 in accordance with an embodiment is shown. Identifier to configuration map repository 232 may include information regarding associations between various identifiers of configurable devices and corresponding configurations.

In an embodiment, identifier to configuration map repository 232 includes any number of entries 270, 278. Each of entries 270, 278 include information regarding a corresponding association. Each entry may include, for example, device identifier 272, configuration data 274, and/or other information (e.g., such as a type identifier).

Device identifier 272 may include any quantity of type of information usable to discriminate a configurable device from other configurable devices. For example, device identifier 272 may be implemented with a UUID liked to a visual indicator such as a QR code, barcode, etc. When a visual indicator is read, a corresponding UUID for the visual indicator may be obtained (e.g., the visual indicators may include information from which the UUID may be derived, obtained, etc.). The UUID may be used to discriminate an entry, corresponding to the configurable device from which the visual indicator is obtained, from other entries of identifier to configurable map repository 232. In other words, the visual indicator of a configurable device may be used as (or to obtain) a key (e.g., a UUID) for identifier to configuration map repository 232 usable to identify a corresponding entry.

Configuration data 274 may include information regarding a configuration of a configurable device, operational details regarding the configurable device (e.g., resources available for use when configured with the configuration corresponding to an entry), and/or other information such as, for example, identifiers (e.g., from a user, purchaser), ascribed device class information, etc.

Entries 270, 278 may be implemented in a searchable format such as, for example, as look up table. Entries 270, 278 may be implemented with other types of data structures (e.g., databases, tables, unstructured data, linked lists, etc.) without departing from embodiments disclosed herein.

While illustrated in FIG. 2D as including specific types and quantities of data, an identifier to configuration map repository 232 in accordance with an embodiment may include different, less, and/or additional data from that illustrated in FIG. 2D. Additionally, while described as being stored in a specific location, the data may be stored in other locations, may be spanned across any number of devices, and/or may be integrated with other types of data without departing from embodiments disclosed herein.

Figure 3A:
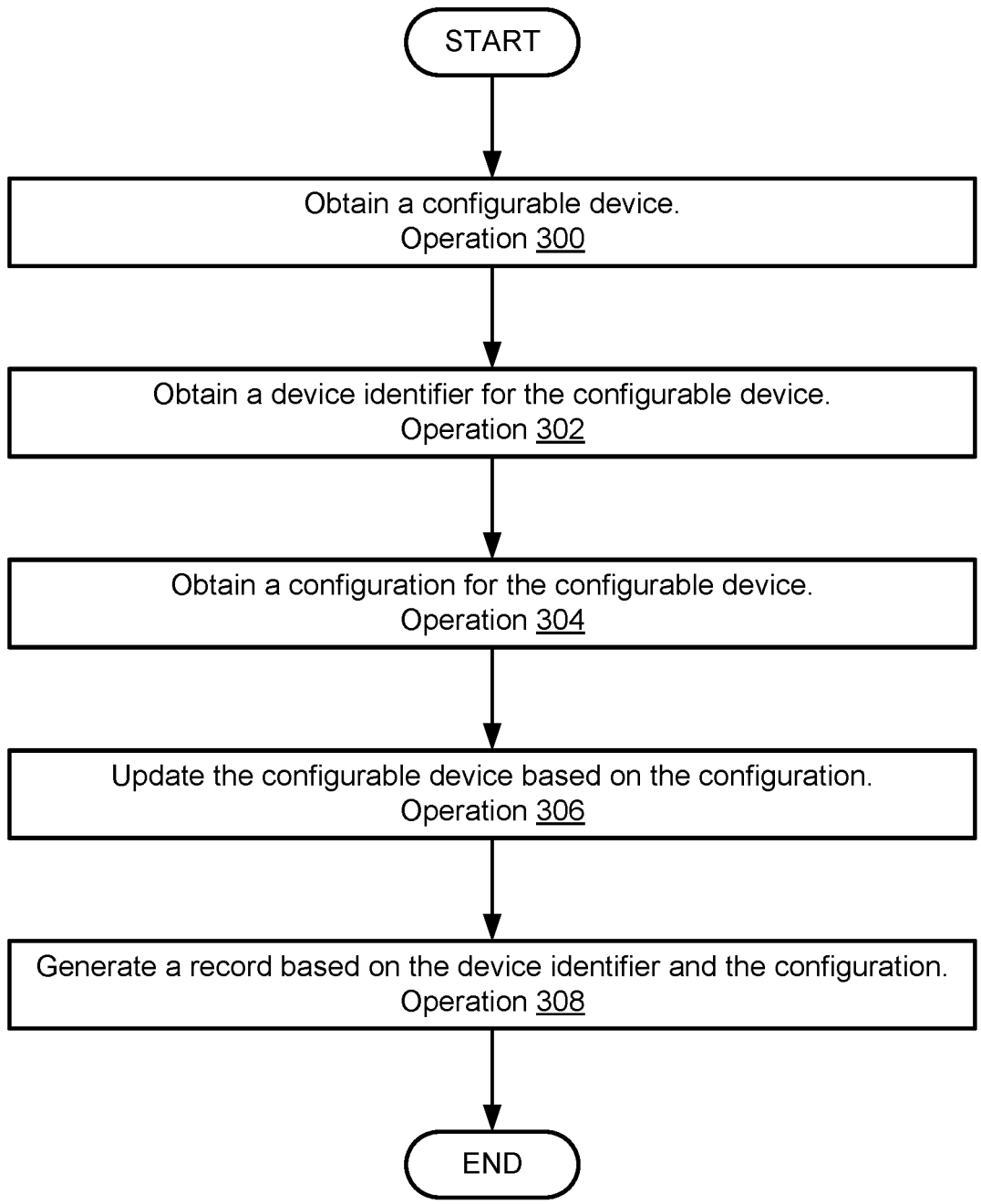
FIG. 3A shows a flow diagram illustrating a method of configuring a configurable device in accordance with an embodiment.
Figure 4A:
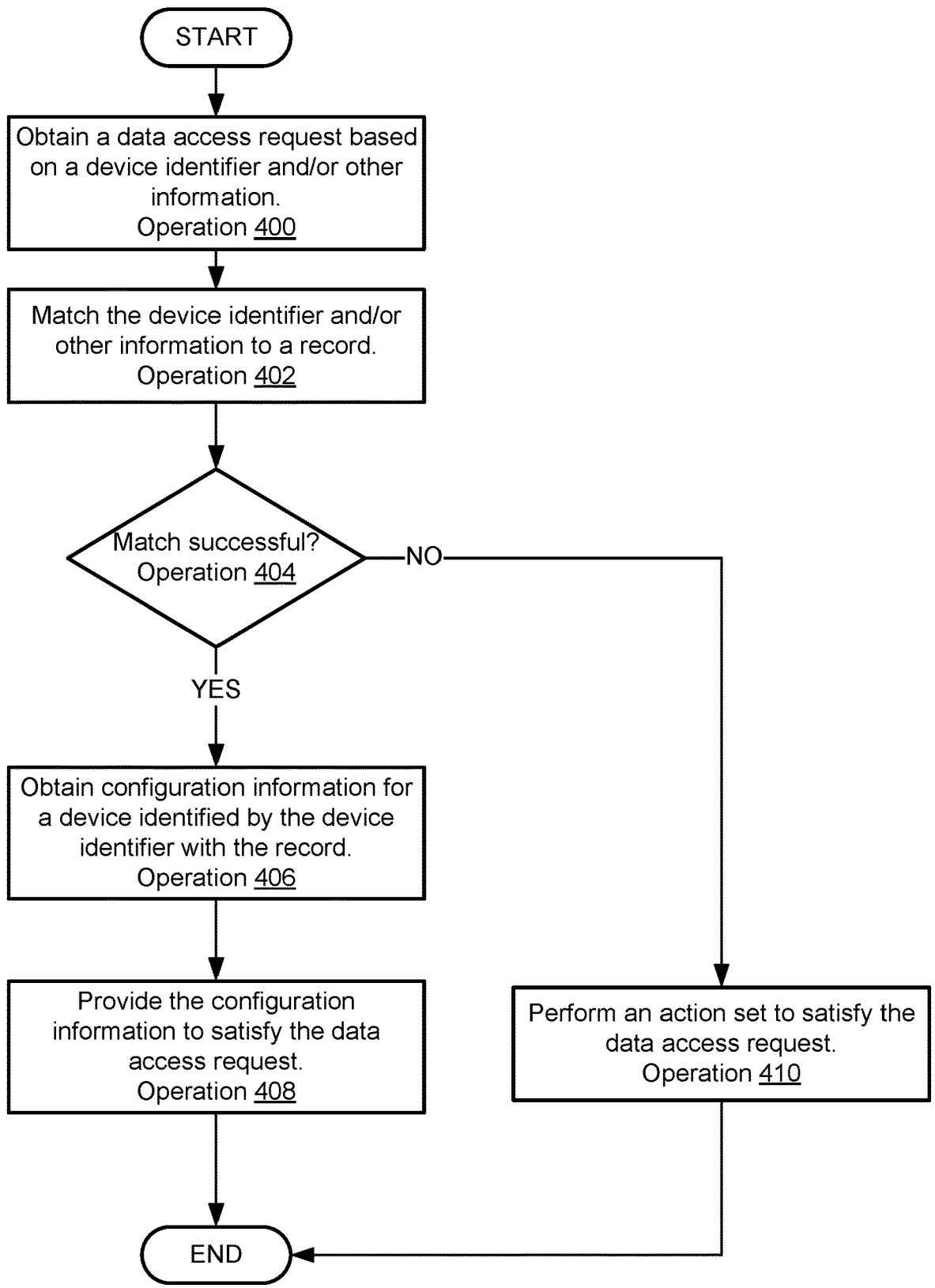
FIG. 4A shows a flow diagram illustrating a method servicing data access requests in accordance with an embodiment.
Figure 4B:
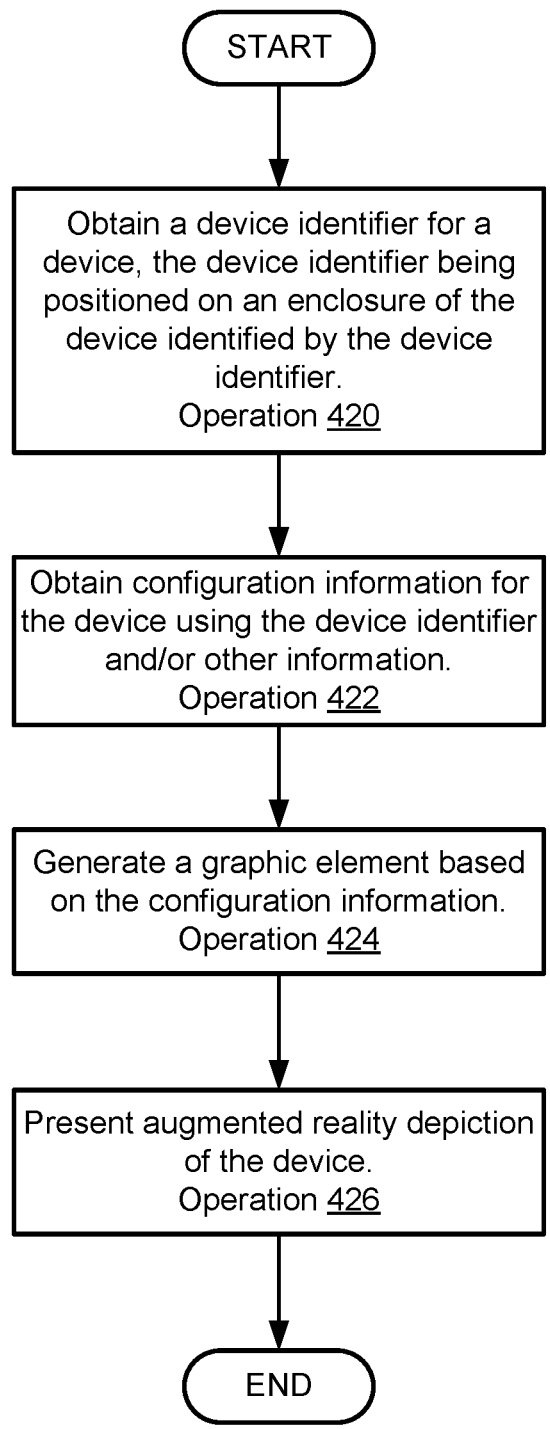
FIG. 4B shows a flow diagram illustrating a method of providing an augmented reality depiction in accordance with an embodiment.

As discussed above, the components of FIG. 1 may perform various methods to manage configurable devices. FIGS. 3A, 4A, and 4B illustrate methods that may be performed by the components of FIG. 1. In the diagrams discussed below and shown in FIGS. 3A, 4A, and 4B, any of the operations may be repeated, performed in different orders, and/or performed in parallel with or in a partially overlapping in time manner with other operations.

Turning to FIG. 3A, a flow diagram illustrating a method of configuring a configurable device in accordance with an embodiment is shown.

Prior to operation 300, a configurable device may be manufactured. At the time of manufacturing, visual indicators may be positioned on the configurable device. The visual indicators may be used as keys to identify, for example, expected hardware of a configurable device (e.g., stored in a database maintained by a device manufacturer).

The visual indicators may include, for example, a first visual indicator reflecting a device discriminator (e.g., a device identifier) and/or a second visual indicator reflecting a type discriminator (e.g., a type identifier). Any of the visual indicators may be implemented with graphics adapted for machine reading such as, for example, barcodes, QR codes, serial numbers, product part identifiers, etc.

At operation 300, a configurable device is obtained. The configurable device may be obtained, for example, by receiving it from a manufacturer. The configurable device may be obtained at a location where the configurable device will be configured to meet expectations of a future user.

Figure 3B:
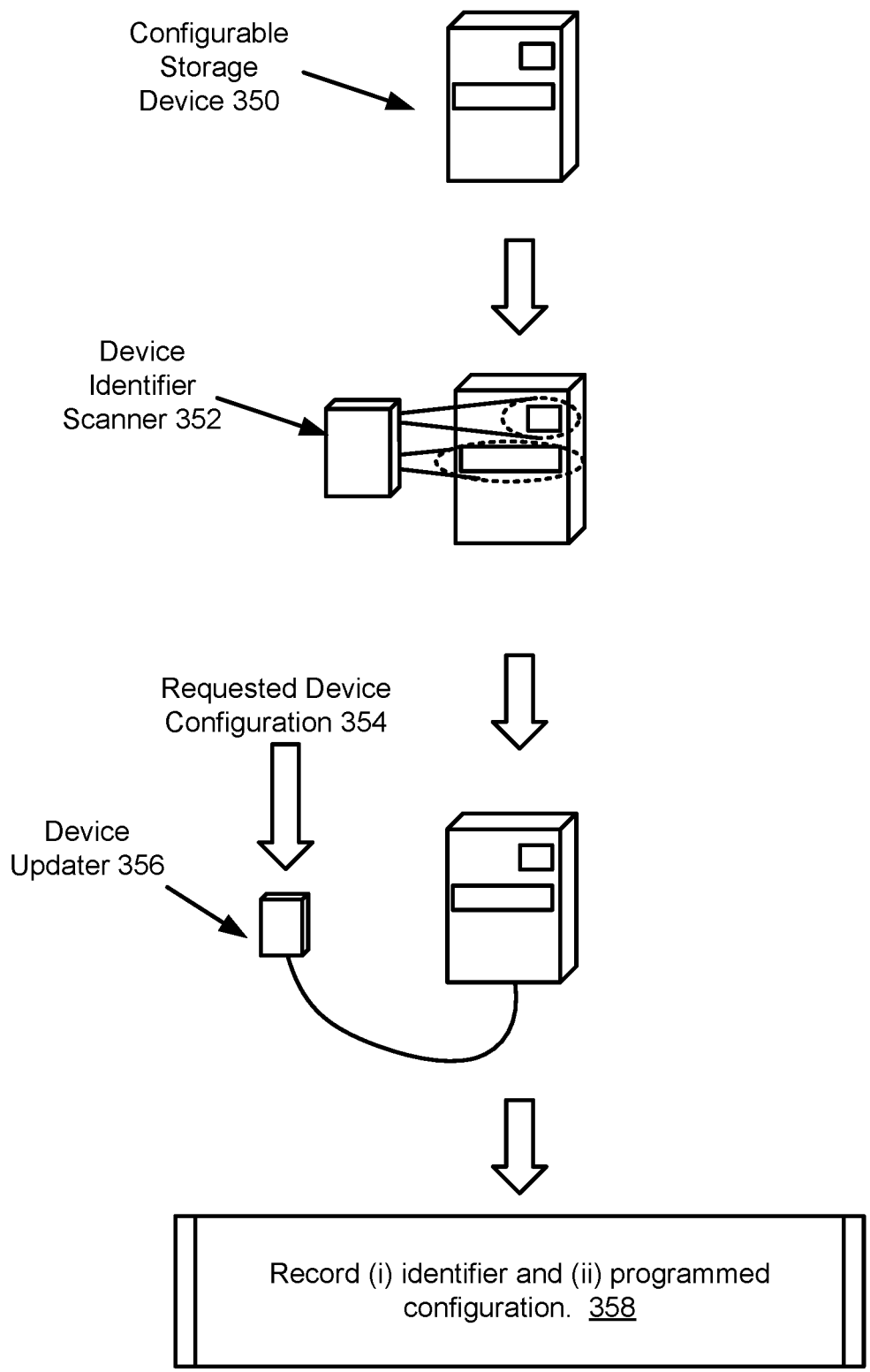
FIG. 3B shows a block diagram illustrating a configuration of a configurable device in accordance with an embodiment.

At operation 302, a device identifier for the configurable device is obtained. In an embodiment, the device identifier is obtained by reading it from the configurable device. The device identifier may be read by, for example, scanning a visual indicator of the configurable device corresponding to the configurable device. Refer to FIG. 3B for additional details regarding scanning visual indicators. A type identifier (and/or other identifiers) may be similarly obtained at operation 302.

At operation 304, a configuration for the configurable device is obtained. The configuration may be obtained from, for example, a configuration manager. For example, the configuration may be obtained from a user that provides the configuration to the configuration manager. In an embodiment, the configuration is provided by the user by selecting one or more features for the configurable device from a graphical user interface presented on a display of a computing device used by the user. The selected features may be used to derive the configuration for the configurable device. The configuration may be stored in a database or other data structure maintained by the configuration manager. The configuration may read the configuration from the database and provide it to the support manager in response to a request from the support manager for the configuration.

At operation 306, the configuration of the configurable device is updated based on the configuration. In an embodiment, the configuration is updated by programming configurable hardware of the configurable device. Programming the configurable hardware may include, for example, storing firmware on a controller, modifying configuration settings in the controller, and/or performing other actions that may cause the operation of the configurable device to be modified for the configuration. Configuring the configurable device may cause the configurable device to operate in accordance with the configuration.

For example, consider a scenario where the configurable device is a storage device. The storage device may be configured by, for example, modifying settings of a controller of the storage device that cause the storage device to use storage resources to store parity data (or other types of data) usable to reduce the susceptibility of the storage device to data loss/corruption, at the cost of reducing the total effective storage capacity of the configurable device.

At operation 308, a record, based on the device identifier and the configuration, is generated. The record may be an entry of an identifier to configuration map repository 232. The entry may associate the identifier of the configurable device with the configuration used to configure the configurable device. Thus, when the identifier for the configurable device is used as a key for the identifier to configurable map repository, the configuration used to configure the configurable device may be obtained. The generated record may be stored as part of the identifier to configuration map repository In an embodiment, the entry may also include a type identifier and/or other types of information usable (with or in isolation from) to discriminate the entry from other entries.

The method may end following operation 308.

Turning to FIG. 3B, a diagram of configuring a configurable data storage device 350 in accordance with an embodiment is shown. When configurable storage device 350 is manufactured, it may not be configured. Configurable storage device 350 may be shipped to a configuration location (which may be the same or different from where configurable storage device 350 was manufactured, shipping may only include moving configurable storage device 350 within a manufacturing facility) where configurable devices are configured based on future user expectations.

Prior to shipping, configurable storage device 350 may be marked with visual indicators for an identity of the configurable storage device 350, a type of configurable storage device 350, and/or other characteristics.

Once received at the configuration location, a device identifier scanner 352 may scan configurable storage device 350 for the visual indicators. In FIG. 352, the scanning processes is indicated with the ovals outlined with dashed lines.

Device identifier scanner 352 may be used to scan configurable storage devices as the devices are received at the configuration locations. The scanned visual indicators may be used to obtain hardware information for configurable storage device 350 from a source such as a manufacturer maintained database.

After the visual indicators are scanned, a requested device configuration 354 may be obtained (e.g., from a platform through which future users indicate their desired configurations for the configurable devices, when using the platform, the users may not be notified that a configurable device will be configured, rather, the user may be presented with a list of devices with corresponding information and the user may select one of the devices, a configuration may correspond each of the respective devices thereby allowing the user to select/provide the configuration by selecting a device with desired characteristics). Requested device configuration 354 may specify the configuration for a configurable storage device, like configurable storage device 350, so that it will operate in a manner consistent with expectations of a future user of configurable storage device 350.

Device updater 356 may update configurable storage device 350 based on requested device configuration 354 by, for example, updating/modifying controller software, changing configuration settings, etc. After configuration, configured configurable storage device 350 may be shipped to a user associated with requested device configuration 354 (e.g., a user that generated/caused requested device configuration 354 to be generated).

Additionally, a record may be generated 358. The record may associate the device identifier obtained with device identifier scanner 352 and the configuration used by device updater 356 to update configurable storage device 350.

Turning to FIG. 4A, a flow diagram illustrating a method of servicing data access requests in accordance with an embodiment is shown.

At operation 400, a data access request based on a device identifier is obtained. The device identifier may be for a configurable device. The device identifier may be obtained from a client that obtained the device identifier from a visual indicator on the configurable device. The data access request may be based on additional and/or different information such as, for example, a type identifier for the configurable device obtained by the client in a similar and/or different manner.

At operation 402, the device identifier is matched to a record. The device identifier may be matched by using the device identifier as a key to perform a lookup for the record. The device identifier may be matched to the record using additional and/or different information such as, for example, the type identifier for the configurable device.

At operation 404, it is determined whether the match was successful. The match may be successful if the lookup returned a record. The match may not be successful if the lookup did not return any record. The method may proceed to operation 406 if the match is successful. Otherwise, the method may proceed to operation 410 following operation 406 if the match is not successful.

At operation 406, configuration information for the device identified by the device identifier is obtained from the record. For example, the configuration information may be obtained by reading the configuration information from the record.

At operation 408, the configuration information is provided to satisfy the data access request. For example, the configuration information may be provided to the client or other entity that initiated the data access request of operation 400.

The method may end following operation 408.

Returning to operation 404, the method may proceed to operation 410 following operation 404 if the match is not successful.

At operation 410, an action set is performed to satisfy the data access request. The action set may include, for example, (i) sending an error or other type of message to indicate that the configurable device is unknown, (ii) notifying an administrator or other person tasked with managing devices that may be fraudulent, and/or (iii) performing other actions to address a configurable device that is unknown.

The method may end following operation 410.

Turning to FIG. 4B, a flow diagram illustrating a method of validating a configurable device in accordance with an embodiment is shown.

At operation 420, a device identifier for the configurable device is obtained. In an embodiment, the device identifier is obtained using a visual indicator positioned on an external surface of an enclosure of the configurable device. The surface may be positioned such that the visual indicator is likely to be visible even while the configurable device is being used. The visual indicator may be read using, for example, a camera or other image/video capture device. The captured video/image may be subjected to information extraction to obtain the device identifier with the visual indicator. Any number of visual indicators may be subjected to information extraction to obtain any number of identifiers (e.g., device, type, etc.). None of the obtained identifiers may directly indicate a configuration of the configurable device.

At operation 422, configuration information for the configurable device is obtained using the device identifier. The configuration information may be obtained by sending a data access request to a support manager which may service the data access request, as discussed with respect to FIG. 4A. The configuration information may be provided to the client to satisfy the data access request.

At operation 424, one or more graphic elements are generated based on the configuration information.

In an embodiment, the graphic elements are generated using a template. Replacement fields in the template may be replaced to obtain the graphic elements. Refer to FIGS. 4C-4F for additional information regarding graphic element generation.

At operation 426, the graphic elements are used to present an augmented reality depiction of the configurable device. In an embodiment, the augmented reality depiction is presented by updating an image and/or video with the graphic elements. The image and/or video may include a visual indicator associated with the identifier of the configurable device. The image and/or video may be updated by placing the graphic elements with respect to the visual indicator in the image and/or video. For example, the graphic elements may be placed on top of the visual indicator in the image and/or video.

The updated image and/or video may be displayed on a display to a user of the client. The display may be a part of or separate but operably connected to the client.

The method may end following operation 426.

Turning to FIGS. 4C-4F, diagrams illustrating a validation process in accordance with an embodiment is shown.

Figure 4C:
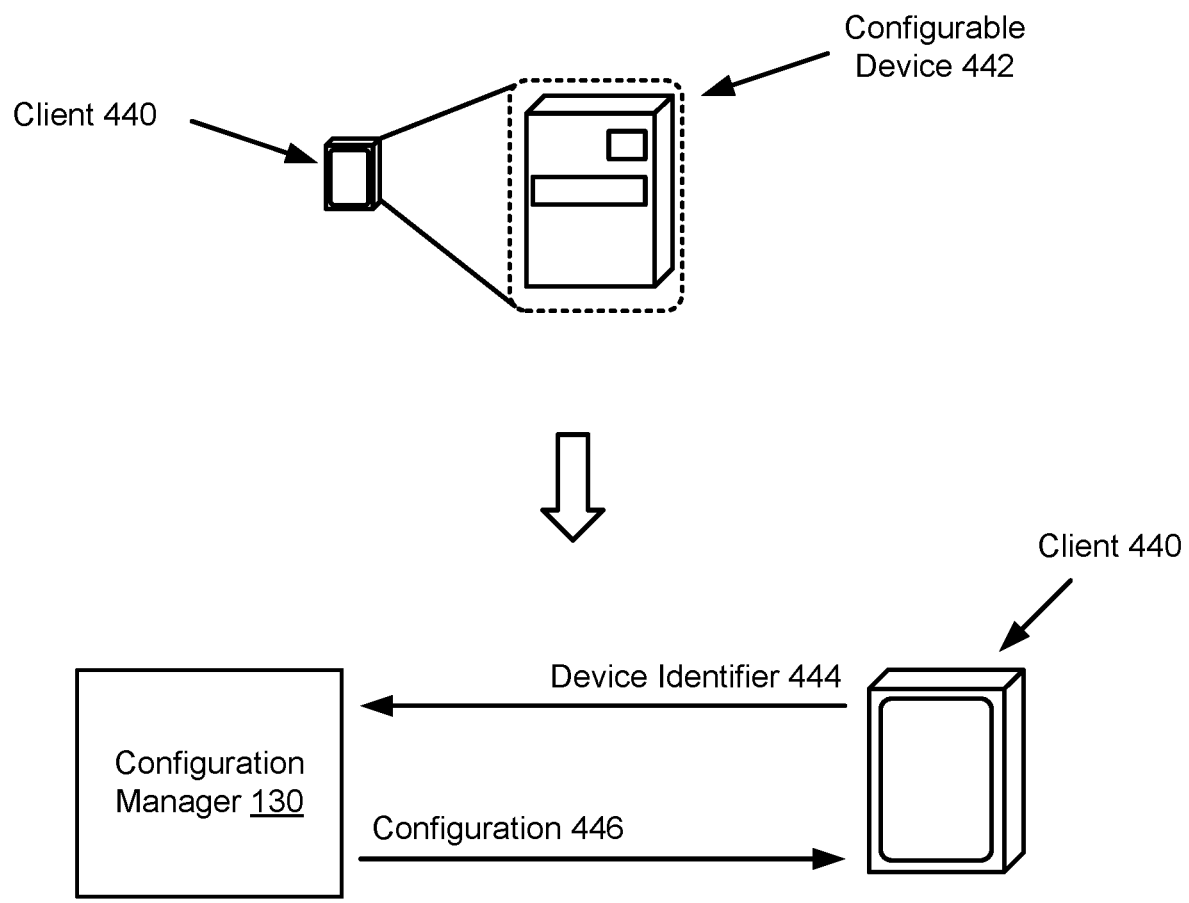
FIGS. 4C-4F show block diagrams illustrating a system in accordance with an embodiment over time.

Turning to FIG. 4C, client 440 scans configurable device 442 for visual indicators. For example, client 440 may use a camera to capture an image depicting a scene in which the configuration device 442 is visible. The image may be from a side from which visual indicators on an enclosure of configurable device 442 are visible.

Once captured, the image may be subjected to information extraction. For example, pixels of the image corresponding to the visual indicators may be identified and used to obtain a device identifier for configurable device 442. In an embodiment, the arrangement and shading of the pixels defines a bit sequence corresponding to the deice identifier of configurable device 442.

After the device identifier is obtained, the device identifier 444 is provided to configuration manager 130 (e.g., as part of a data access request). Configuration manager 130 uses device identifier 444 as a key to lookup corresponding configuration information used to configure configurable device 442. To satisfy the data access request, configuration manager 130 may provide configuration 446 to client 440 specifying the configuration of configurable device 442.

Figure 4D:
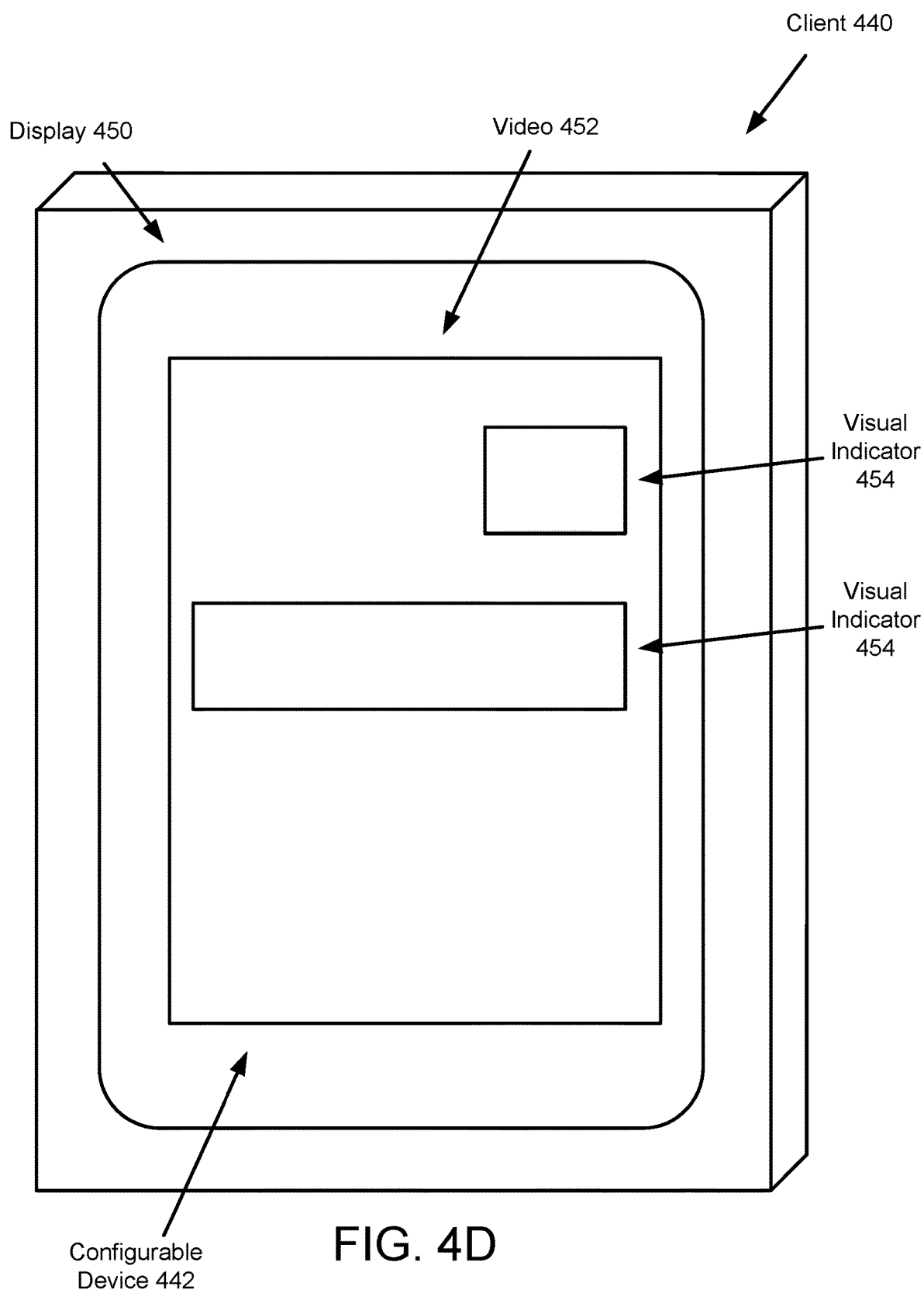
Figure 4E:
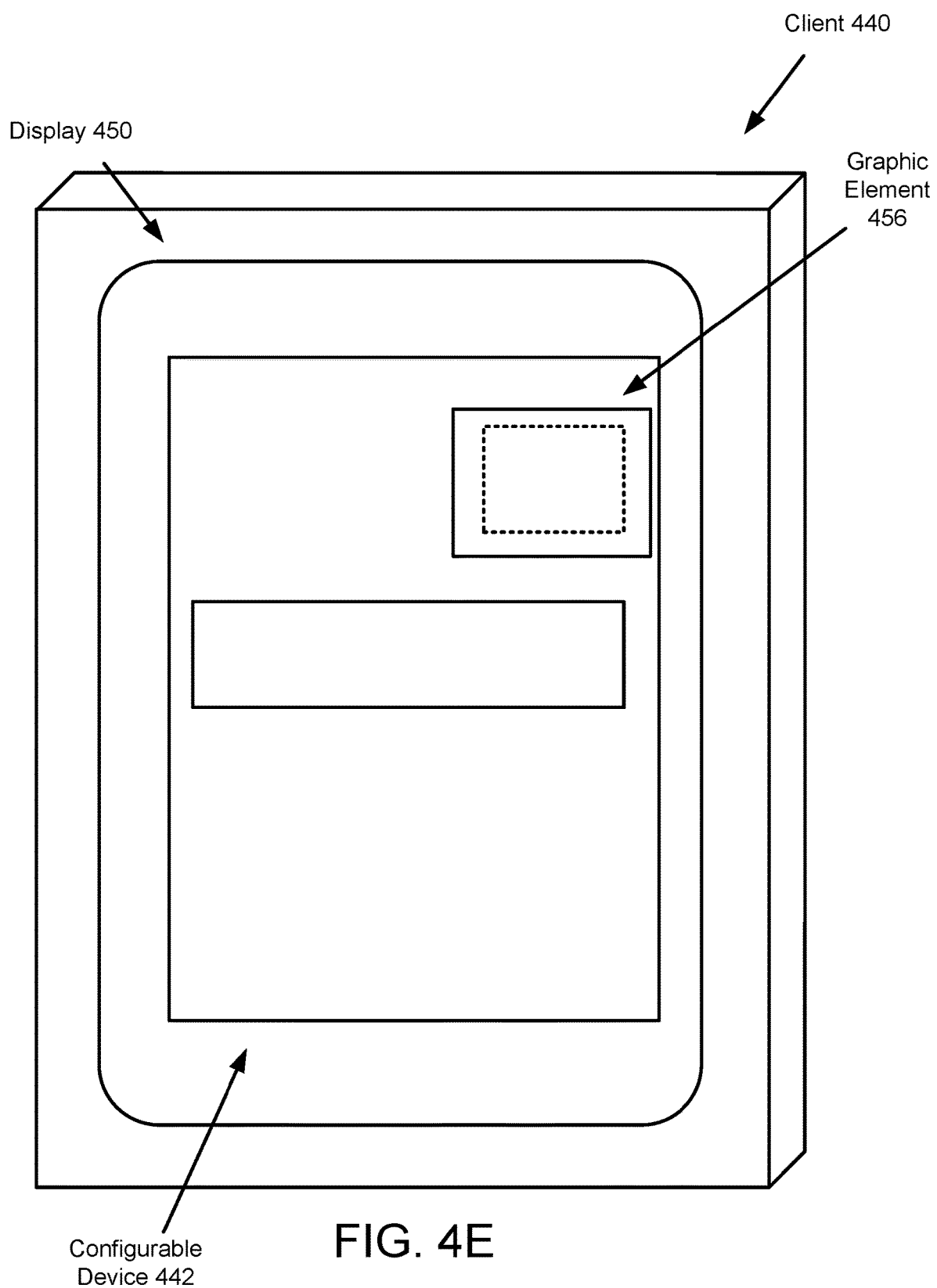

Turning to FIGS. 4D-4E, client 440 begins to capture video 452 depicting configurable device 442 from a viewpoint in which visual indicators 454 are visible. Client 440 beings to display the video on display 450.

To initiate the augmented reality depiction of configurable device 442, client 440 generates graphic element 456 and substantially in real-time places the graphic element 456 in the video positioned where one of the visual indicators (drawn with dashed outline in FIG. 4E) is present in the captured video. Consequently, when the updated video is displayed, the visual indicator may be replaced with graphic element 456 thereby providing an augmented reality depiction of configurable device 442.

Figure 4F:
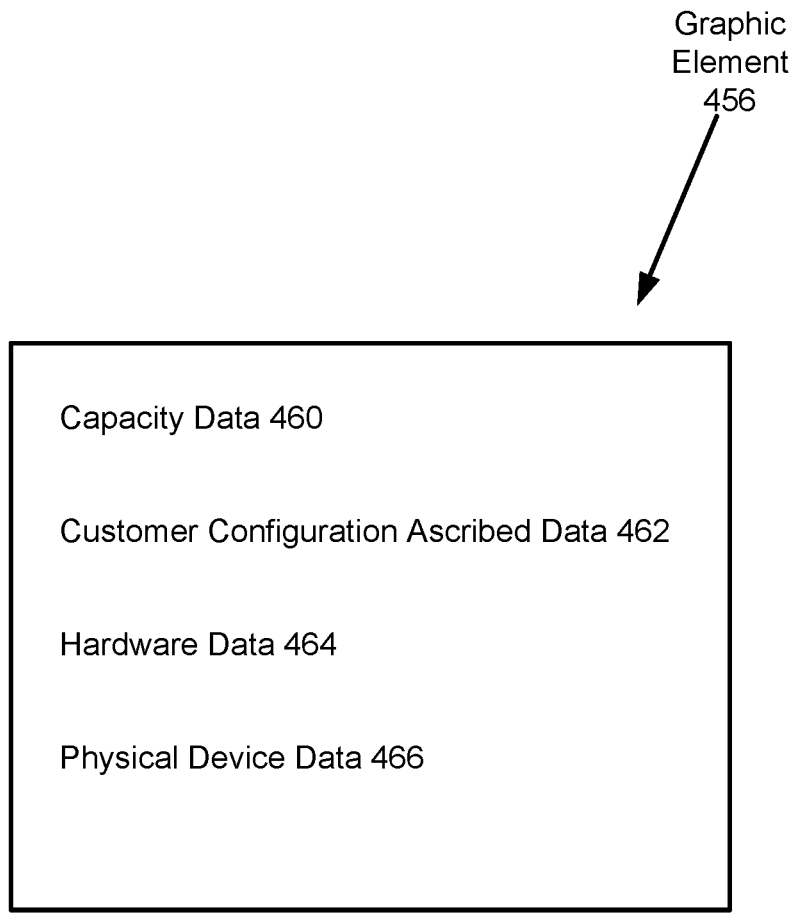

Turning to FIG. 4F, graphic element 456 may include a number of pieces of information not included in the visual indicator. These pieces of information may include capacity data 460 (e.g., which may specify effective storage resources/capacity of configurable device 442), customer configuration ascribed data 462 (e.g., a name ascribed by a user of configurable device 442), hardware data 464 (e.g., information regarding the hardware of configurable device 442), and physical device data 466 (e.g., information regarding the structure, appearance, etc. of configurable device 442). All of this information may have been included in configuration 406.

Thus, via the process illustrated in FIGS. 4C-4F, a user of a client may validate a configurable device may obtain information regarding the configuration of the configurable device without needing to, for example, electrically interact with the configurable device (e.g., by sending electronic requests to the configurable device) nor require that such information may be indicated directly by visual indicators present on the configurable device.

Figure 5A:
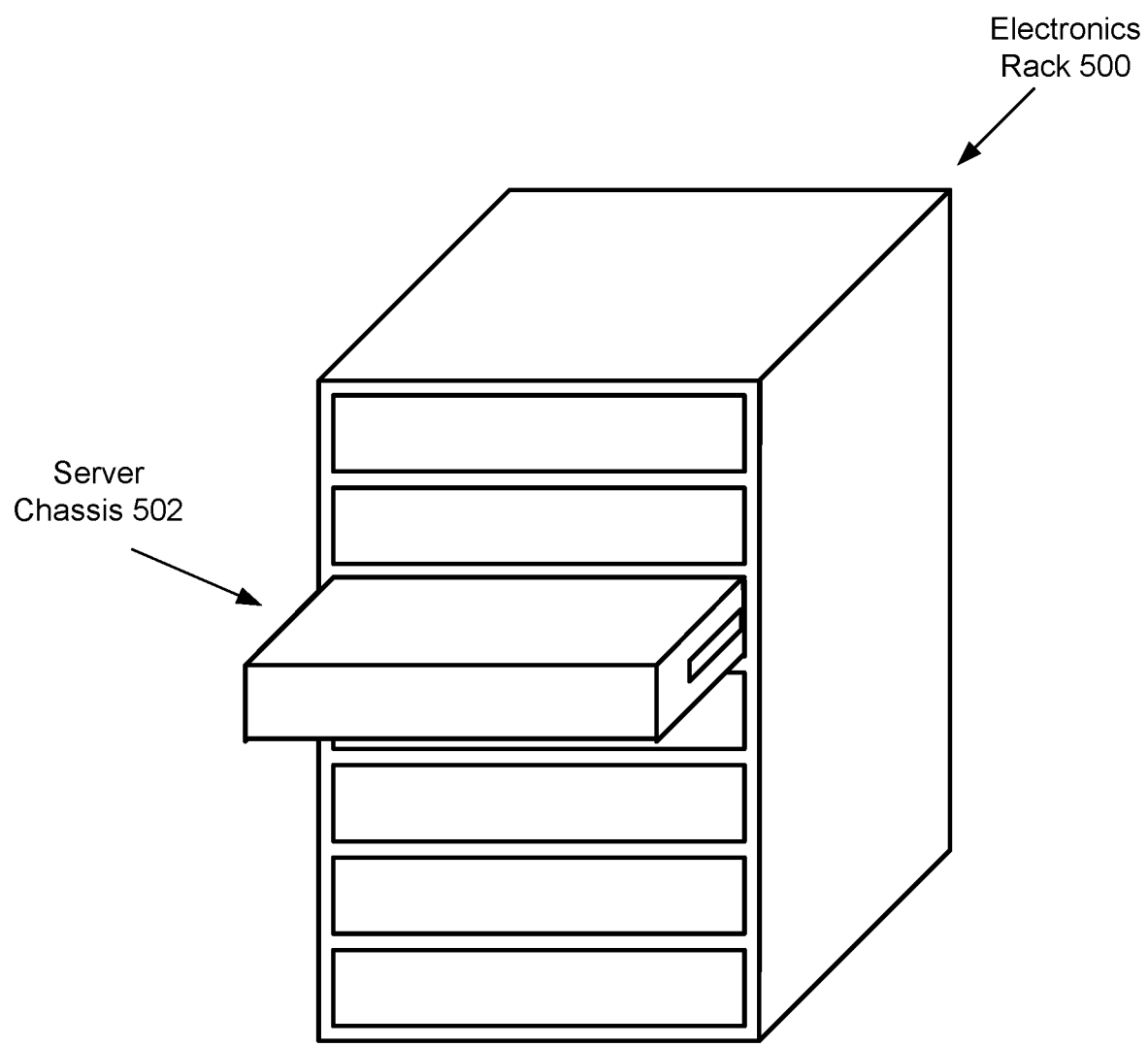
FIGS. 5A-5B show block diagrams illustrating a client use in a high density computing environment in accordance with an embodiment.
Figure 5B:
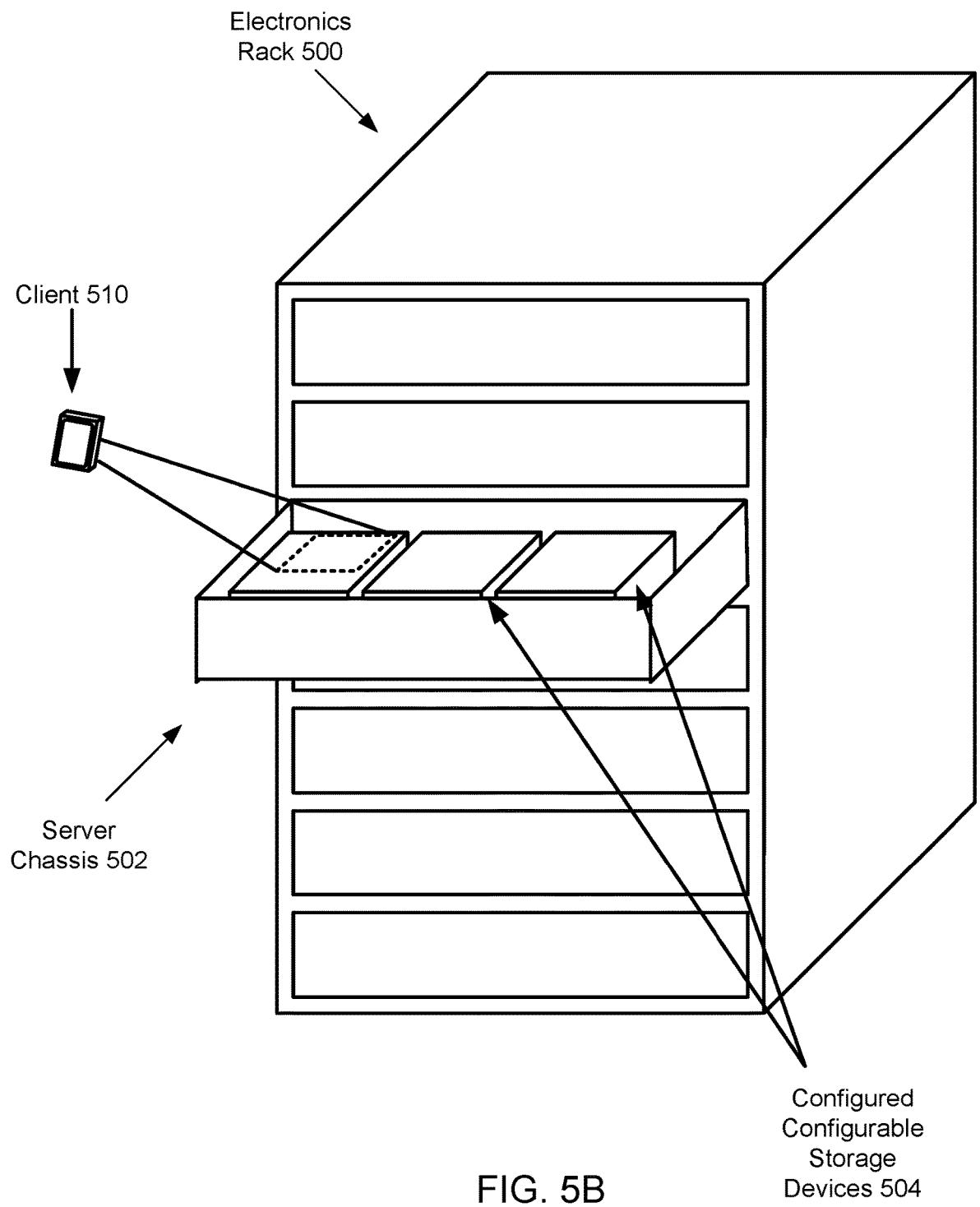

To further clarify an embodiment disclosed herein, FIGS. 5A and 5B show diagrams illustrating use of a client in a high density computing environment in accordance with an embodiment.

Consider a scenario as illustrated in FIG. 5A in which a high density computing environment includes electronics rack 500 in which any number of server chassis (e.g., 502) are positioned. The server chassis may include any number and type of configurable devices. Further, by virtue of the density of the environment and/or workloads being performed, it may be impractical to track cables to identify how various devices are operably connected in the computing environment. Thus, it may be challenging to identify the configuration of any particular configurable device.

Turning to FIG. 5B, in an embodiment, server chassis 502 is implemented as a storage node and includes multiple configured configurable storage devices 504. A person assigned to manage server chassis 502 (and/or other server chassis) may remove a top cover exposing configured configurable storage devices 504. However, due to the visual indicators present on these devices, the person may not be able to identify the various capabilities of these devices from the visual indicators.

To identify the capabilities of these devices, the person may utilize client 510 to provide an augmented reality depiction of configured configurable storage devices 504. To do so, client 510 may obtain images of the visual indicators, use the visual indicators to obtain device identifiers, use the device identifiers to obtain configuration information, and use the configuration information to provide the augmented reality depiction such that the user is able to ascertain the capabilities of each of configured configurable storage devices 504 using the depiction.

Figure 6:
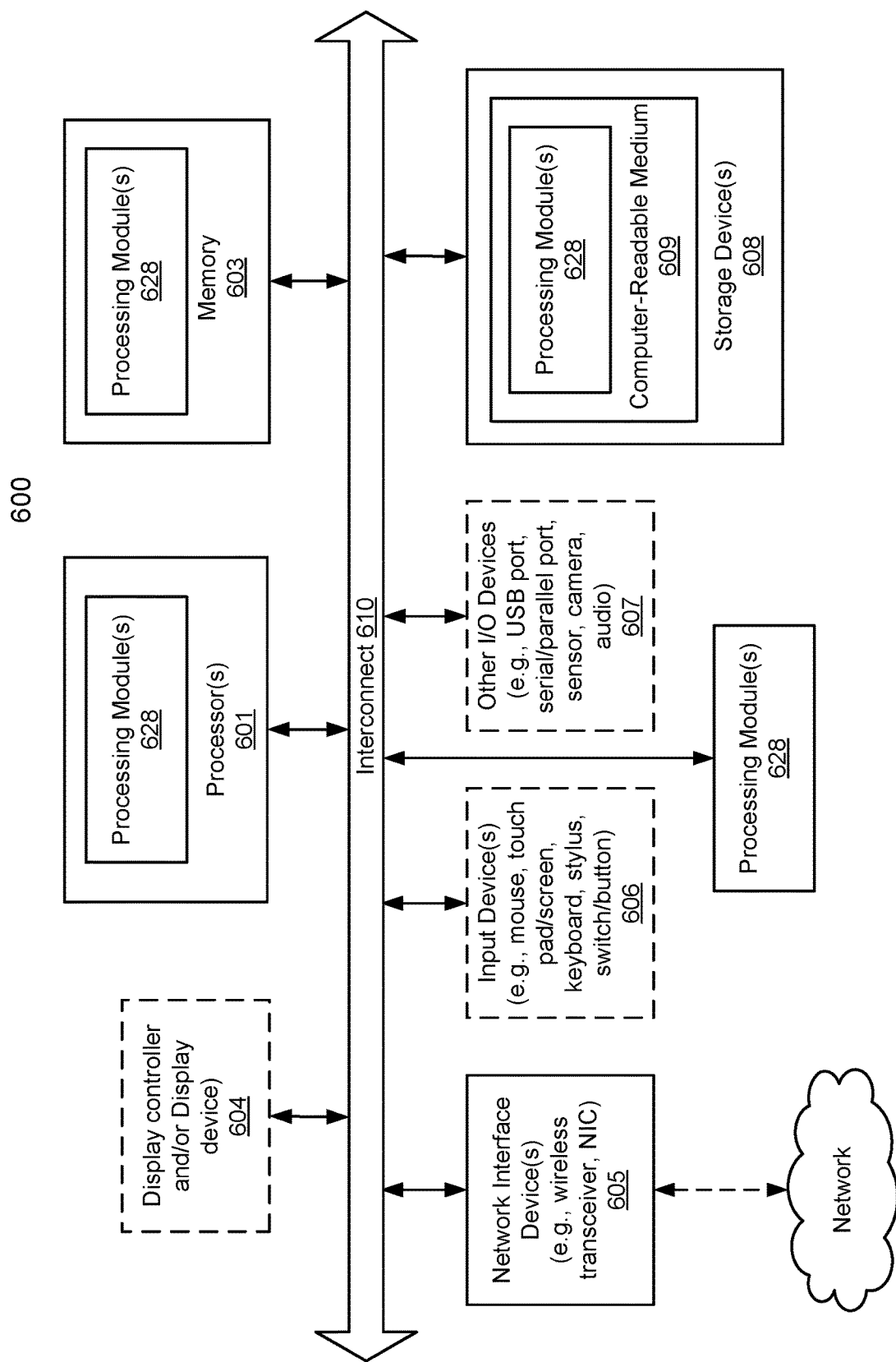
FIG. 6 shows a block diagram illustrating a data processing system in accordance with an embodiment.

Any of the components illustrated in FIGS. 1-5B may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing a configurable device, the method comprising:
    obtaining, by a client, an identifier for the configurable device from an enclosure of the configurable device;
    obtaining, by the client, configuration information for the configurable device using the identifier;
    generating, based on the configuration information, a graphical element that comprises the configuration information shown in textual form within the generated graphical element;
    updating, based on the graphical element, an image of the enclosure based on the identifier present in the image to obtain an updated image; and
    after the image is updated, displaying the updated image on a display.

2. The computer-implemented method of claim 1, wherein the configurable device comprises a storage device for storing data, the storage device comprising:
    hardware for storing data; and
    configurable hardware adapted to be configured into at least two operating states,
    while in a first operating state of the at least two operating states, the configurable hardware manages operation of the hardware to provide storage resiliency to operational errors and a storage capacity,
    while in a second operating state of the at least two operating states, the configurable hardware manages operation of the hardware to provide more of the storage resiliency to the operational errors than is provided in the first operating state and a lower storage capacity than in the first operating state.

3. The computer-implemented method of claim 2, wherein the identifier does not indicate which of the at least two operating states the configurable hardware is configured to operate.

4. The computer-implemented method of claim 3, wherein the configurable device is free of any visual indicators of which of the at least two operating states the configurable hardware is configured to operate.

5. The computer-implemented method of claim 1, wherein obtaining the configuration information comprises:
    sending, by the client, a message based on the identifier of the configurable device to support manager, the message being a key for a database populated with associations between identifiers of configurable devices and configuration information for the configurable devices; and
    receiving, by the client, a response to the message, the response indicating the configuration information.

6. The computer-implemented method of claim 5, wherein the configuration information reflects how configurable hardware of the configurable device was programmed, the programmed configurable hardware defining how hardware resources of the configurable device are used during operation to provide storage resiliency to operational errors and a storage capacity.

7. The computer-implemented method of claim 5, wherein obtaining the identifier comprises:
    obtaining, by the client, an image of the enclosure; and
    obtaining, by the client, a visual indicator corresponding to the identifier using the image of the enclosure,
    wherein the visual indicator discriminates the configurable device from all other configurable devices for which associations present in the database.

8. The computer-implemented method of claim 5, further comprising:
    prior to obtaining the identifier:
    obtaining an un-configured configurable device;
    obtaining a configuration for the configurable device;
    configuring the un-configurable configurable device based on the configuration to obtain the configurable device; and
    populating the database with an association between the identifier and the configuration information, the configuration information being based on the configuration used to configure the un-configured configurable device.

9. The computer-implemented method of claim 8, wherein configuring the un-configurable configurable device decreases a storage capacity of the configurable device and increases wear resistance of the configurable device.

10. The computer-implemented method of claim 8, further comprising:
    prior to obtaining the configuration for the configurable device:
    reading, from the un-configured configurable device, hardware information;
    matching the hardware information read from the un-configured configurable device to hardware information from a vendor of the un-configured configurable device; and
    performing an action set, based on the matching, to manage security of the configurable device.

11. The computer-implemented method of claim 1, wherein
    the client comprises the display, and
    displaying the updated image on the display comprises:
        while substantially in real-time:
            obtaining, by the client, video depicting a scene comprising the configurable device;
            modifying, by the client, frames of the video prior to displaying the updated image on the display based on the graphical element; and
            displaying, using the modified frames and by the client on the display, an augmented reality depiction of the scene depicted in the video where the graphical element is an image that is augmented onto an instance of the configurable device that appears in the video, and wherein the graphical element informs a user viewing the augmented reality depiction of the scene of a storage capacity of the configurable device that is originally not visually indicated on any portion of a physical manifestation of the configurable device outside of the video.

12. The computer-implemented method of claim 11, wherein the graphical element is augmented onto an instance of the configurable device that appears in the video by replacing, by the client and within a same frame of the video, pixels corresponding to the identifier on the instance of the configurable device that appears in the video with pixels making up the graphical element.

13. A non-transitory machine-readable medium having instructions stored therein, which when executed by a processor, cause the processor to perform operations for managing a configurable device, the operations comprising:
   obtaining, by a client, an identifier for the configurable device from an enclosure of the configurable device;
   obtaining, by the client, configuration information for the configurable device using the identifier;
   generating, based on the configuration information, a graphical element that comprises the configuration information shown in textual form within the generated graphical element;
   updating, based on the graphical element, an image of the enclosure based on the identifier present in the image to obtain an updated image; and
   after the image is updated, displaying the updated image on a display.

14. The non-transitory machine-readable medium of claim 13, wherein the configurable device comprises a storage device for storing data, the storage device comprising:
   hardware for storing data; and
   configurable hardware adapted to be configured into at least two operating states,
   while in a first operating state of the at least two operating states, the configurable hardware manages operation of the hardware to provide storage resiliency to operational errors and a storage capacity,
   while in a second operating state of the at least two operating states, the configurable hardware manages operation of the hardware to provide more of the storage resiliency to the operational errors than is provided in the first operating state and a lower storage capacity than in the first operating state.

15. The non-transitory machine-readable medium of claim 14, wherein the identifier does not indicate which of the at least two operating states the configurable hardware is configured to operate.

16. The non-transitory machine-readable medium of claim 15, wherein the configurable device is free of any visual indicators of which of the at least two operating states the configurable hardware is configured to operate.

17. A client, comprising:
   a processor; and
   a memory coupled to the processor to store instructions, which when executed by the processor, cause the processor to perform operations for managing a configurable device, the operations comprising:
      obtaining an identifier for the configurable device from an enclosure of the configurable device;
      obtaining configuration information for the configurable device using the identifier;
      generating, based on the configuration information, a graphical element that comprises the configuration information shown in textual form within the generated graphical element;
      updating, based on the graphical element, an image of the enclosure based on the identifier present in the image to obtain an updated image; and
      after the image is updated, displaying the updated image on a display.

18. The client of claim 17, wherein the configurable device comprises a storage device for storing data, the storage device comprising:
   hardware for storing data; and
   configurable hardware adapted to be configured into at least two operating states,
   while in a first operating state of the at least two operating states, the configurable hardware manages operation of the hardware to provide storage resiliency to operational errors and a storage capacity,
   while in a second operating state of the at least two operating states, the configurable hardware manages operation of the hardware to provide more of the storage resiliency to the operational errors than is provided in the first operating state and a lower storage capacity than in the first operating state.

19. The client of claim 18, wherein the identifier does not indicate which of the at least two operating states the configurable hardware is configured to operate.

20. The client of claim 19, wherein the configurable device is free of any visual indicators of which of the at least two operating states the configurable hardware is configured to operate.

* * * * *